US012574695B2

(12) United States Patent
Chen

(10) Patent No.: US 12,574,695 B2
(45) Date of Patent: Mar. 10, 2026

(54) SOUND RECEIVING/BROADCASTING SYSTEM

(71) Applicant: iMage Technology CO., LTD., Taipei City (TW)

(72) Inventor: Hong-Lin Chen, Taipei City (TW)

(73) Assignee: IMAGE TECHNOLOGY CO., LTD., Taipei City (TW)

( * ) Notice: Subject to any disclaimer, the term of this patent is extended or adjusted under 35 U.S.C. 154(b) by 194 days.

(21) Appl. No.: 18/416,142

(22) Filed: Jan. 18, 2024

(65) Prior Publication Data

US 2025/0240584 A1     Jul. 24, 2025

(51) Int. Cl.
H04R 27/00     (2006.01)
G06F 3/16     (2006.01)
H04H 20/61     (2008.01)

(52) U.S. Cl.
CPC ............. H04R 27/00 (2013.01); G06F 3/165 (2013.01); H04H 20/61 (2013.01)

(58) Field of Classification Search
CPC .......... H04R 27/00; G06F 3/165; H04H 20/61
See application file for complete search history.

(56) References Cited

U.S. PATENT DOCUMENTS

| | | | |
|---|---|---|---|
| 12,282,701 B2* | 4/2025 | Kim | H04R 3/12 |
| 2005/0231588 A1* | 10/2005 | Yang | H04N 7/148 |
| | | | 375/E7.199 |

| | | | |
|---|---|---|---|
| 2010/0166200 A1* | 7/2010 | Truong | H04M 9/082 |
| | | | 381/66 |
| 2012/0237054 A1* | 9/2012 | Eo | H04R 5/04 |
| | | | 381/80 |
| 2015/0131825 A1* | 5/2015 | Kim | H04R 5/04 |
| | | | 381/300 |
| 2019/0110144 A1* | 4/2019 | Jeanne | H04R 27/00 |
| 2021/0306749 A1* | 9/2021 | Young | H04W 74/002 |

* cited by examiner

*Primary Examiner* — Phung-Hoang J Nguyen
(74) *Attorney, Agent, or Firm* — MUNCY, GEISSLER, OLDS & LOWE, P.C.

(57)          ABSTRACT

A sound receiving/broadcasting system according to the present invention includes a master device and a plurality of slave sound receiving/broadcasting devices. The master device wirelessly communicates with each slave sound receiving/broadcasting devices. Upon receiving a first audio input signal, the master device transmits a first transmission signal to each of the slave sound receiving/broadcasting devices, and all of the slave sound receiving/broadcasting devices separately output first output sounds according to the received first transmission signals. One of the slave sound receiving/broadcasting devices, upon receiving a second input sound and generating a second audio input signal, transmits a second transmission signal to the master device, and the master device transmits a third transmission signal to each of the slave sound receiving/broadcasting devices according the received second transmission signal, and all of the slave sound receiving/broadcasting devices separately output corresponding second output sounds according to the received third transmission signal.

8 Claims, 15 Drawing Sheets

2

27

26

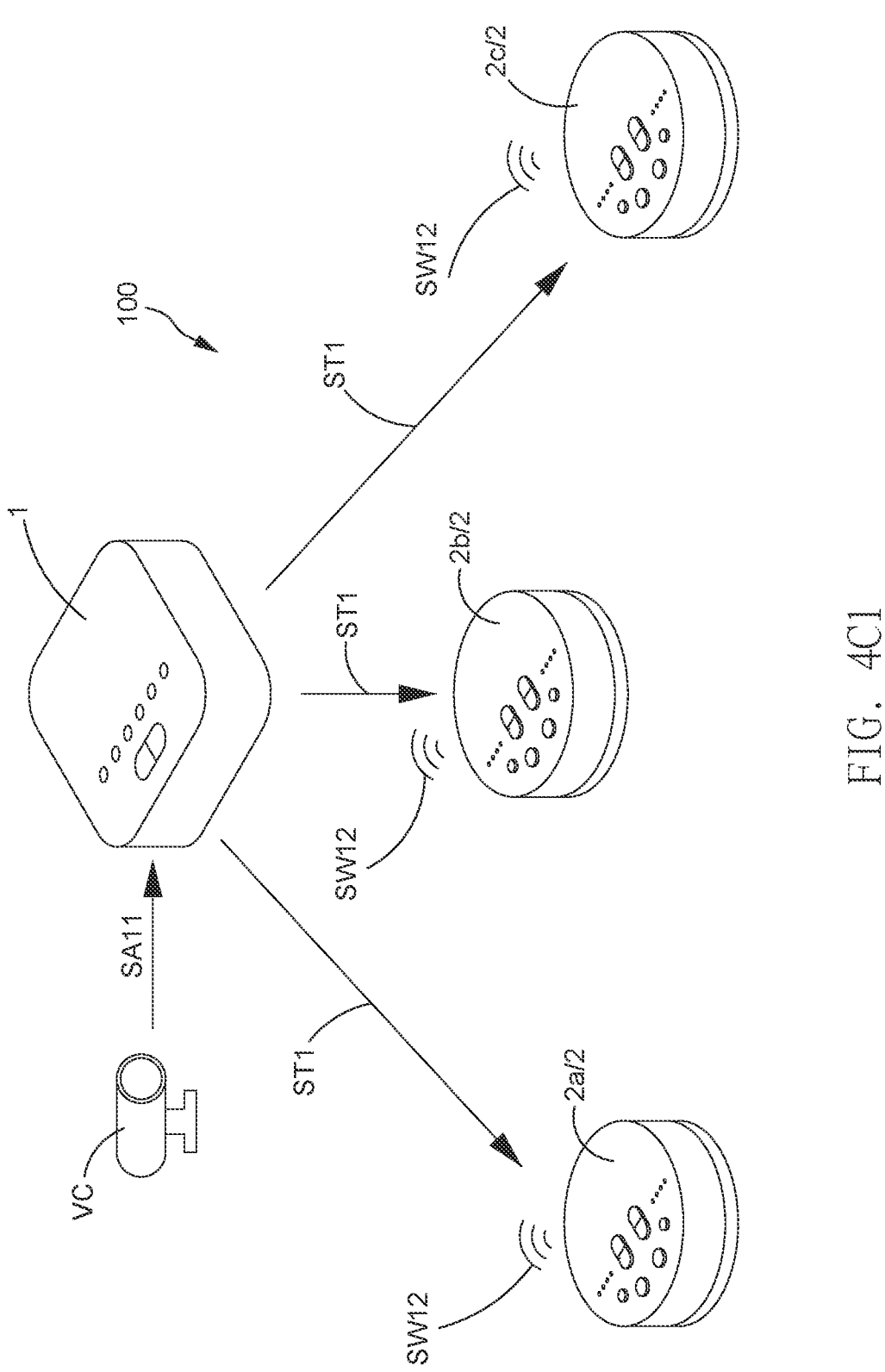
FIG. 4C1

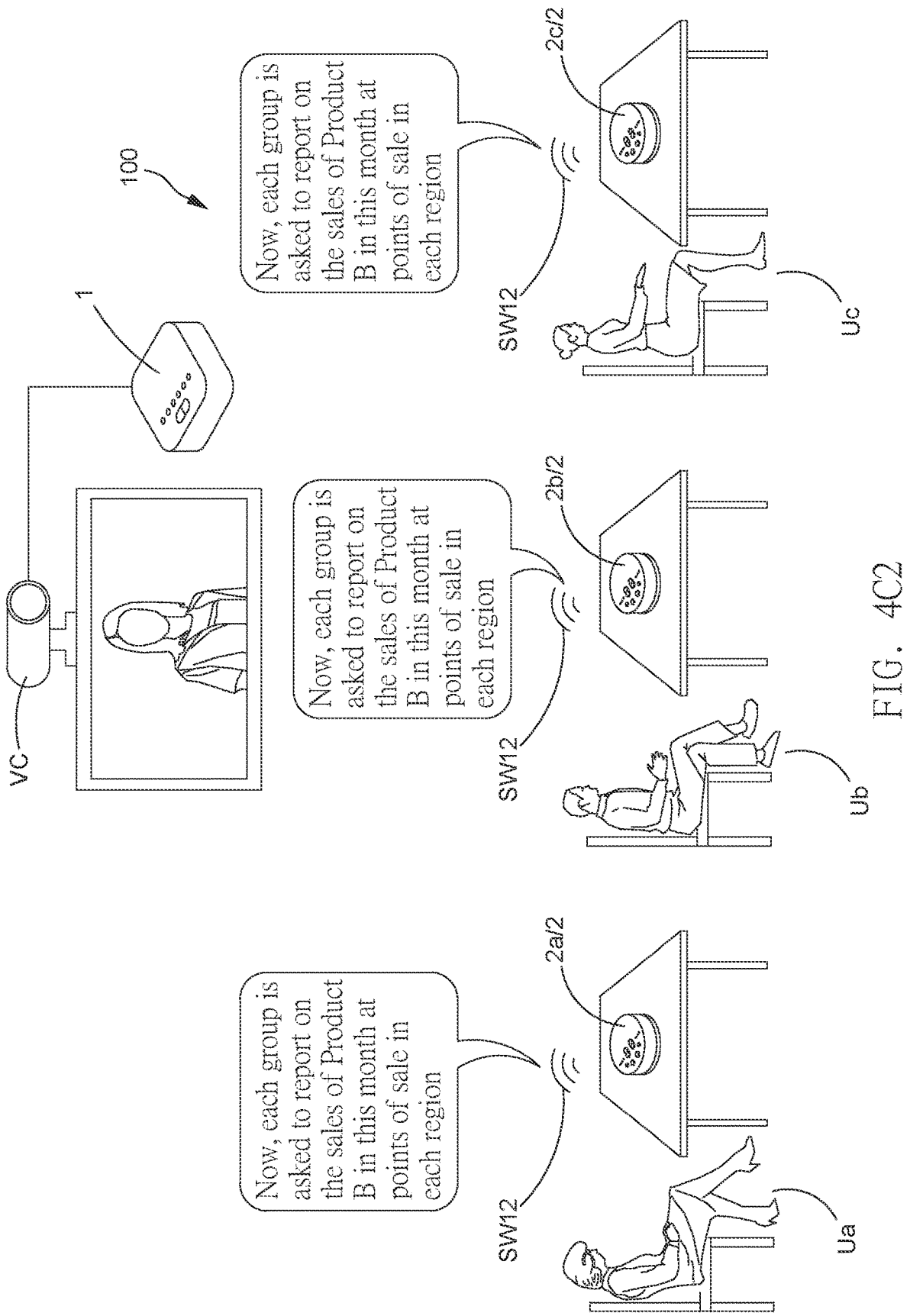
FIG. 4C2

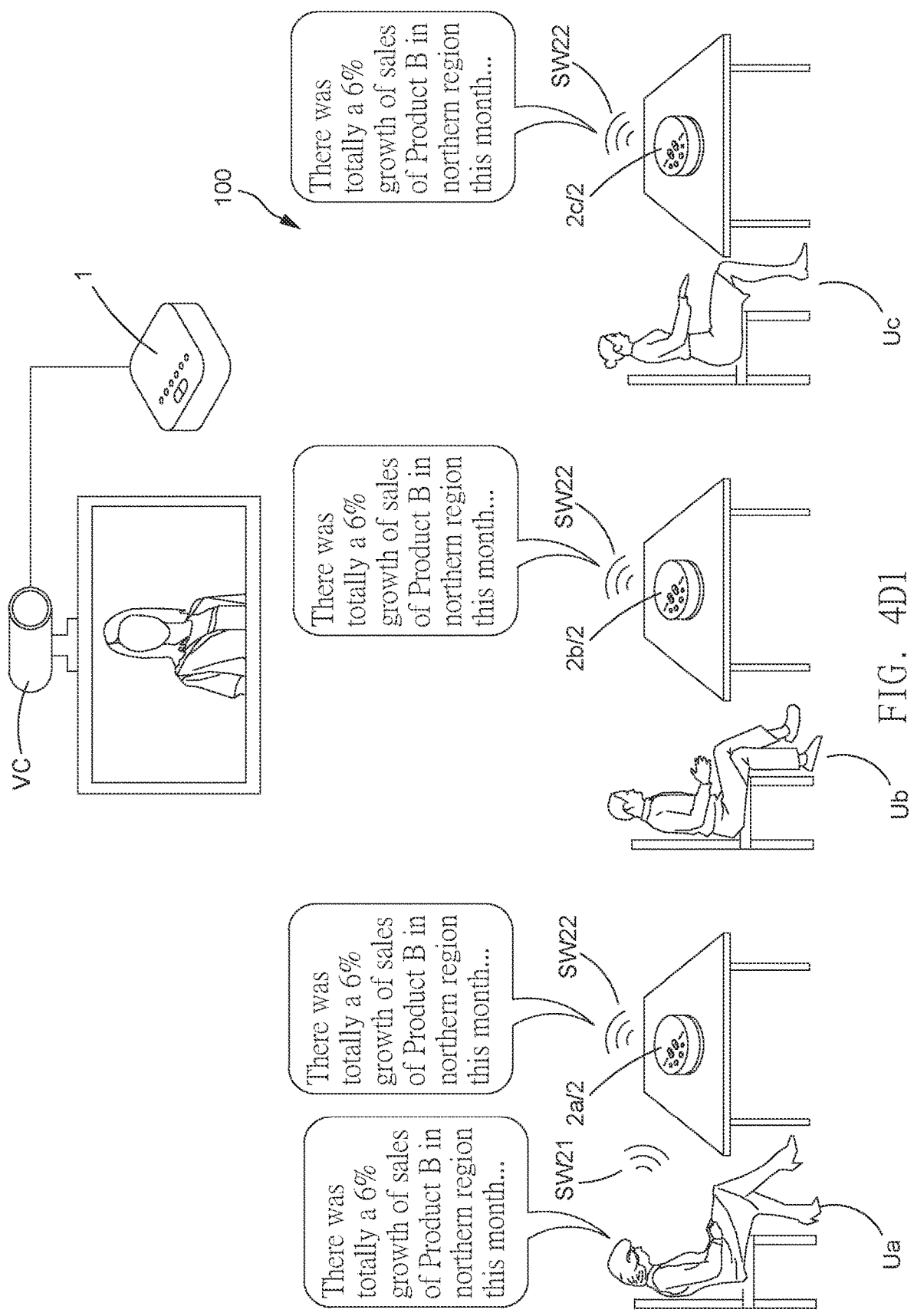
FIG. 4D1

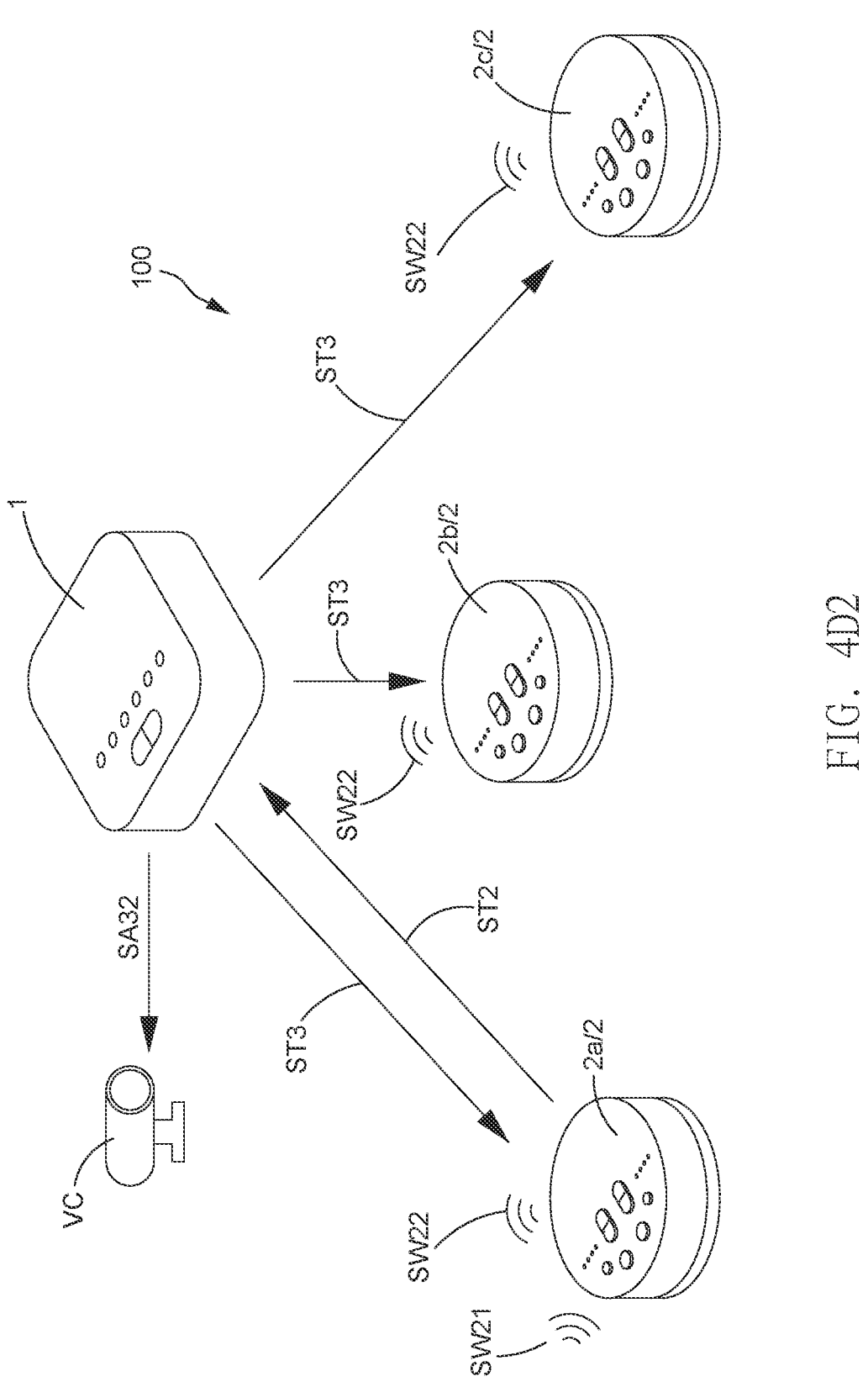
FIG. 4D2

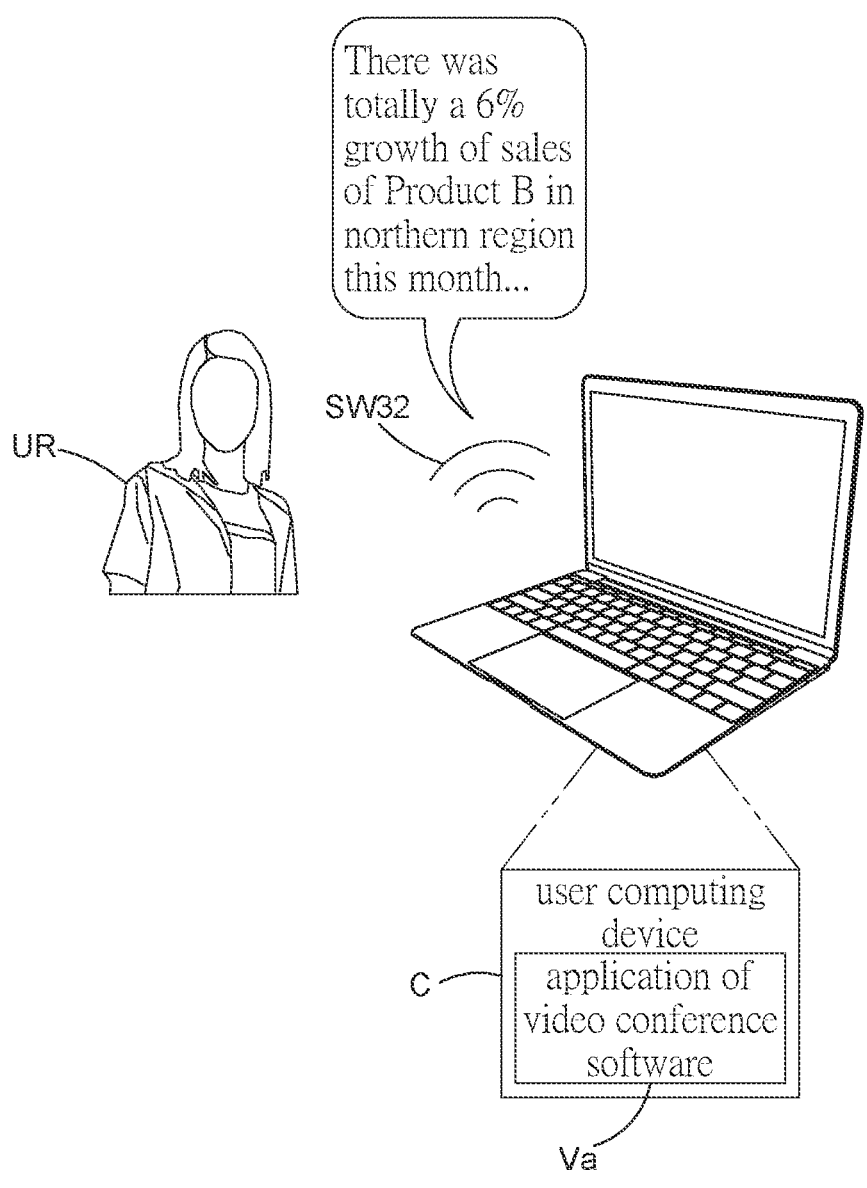
FIG. 4D3

SOUND RECEIVING/BROADCASTING SYSTEM

FIELD OF THE INVENTION

The present invention relates to a communication system, and more particularly to a system that transmits and receives audio signals and sounds.

BACKGROUND OF THE INVENTION

In the contemporary specialization and globalization era for Industry, commerce, and services business, lots of corporations have the demands for doing business in an inter-country and inter-region manner. Thus, a department of a corporation often needs to do online video conferences with other departments at other sites for business conferences. In case a member of the corporation takes a business travel out of town, it is also necessary to hold a remote video conference with other members in the office of the corporation for business conferences.

Further, for certain large-scale companies, a large conference room is a must for employees to meet together for the conference. In such a conference room of a large space in which a lot of people are staying, it is a challenge to allow the speeches of everyone to be heard by other people and to have everyone hear the speeches of other people present there clearly. In case a remote meeting participant is present, it is also necessary to have everyone in the large space where to hear the sound of the remote participant transmitting through the computers and the network. Thus, there is a need to have a system that satisfies the above requirements and is suitable for the needs discussed above.

SUMMARY OF THE INVENTION

In view of the above problems, the present invention aims to provide a sound receiving/broadcasting system, which makes improvements over the defects of the prior art and enhances industrial utilization thereof.

The technical solution adopted in the present invention provides a sound receiving/broadcasting system, which comprises a master device and a plurality of slave sound receiving/broadcasting devices, wherein the master device comprises: an audio input/output interface, which is arranged to generate a first audio input signal from a first input sound received from an external device or to transmit a third audio output signal to the external device; a first audio signal processing circuit, which is in electrical connection with the audio input/output interface, wherein the first audio signal processing circuit comprises an audio mixer circuit; a first controller, which is in electrical connection with the first audio signal processing circuit; and a plurality of first communication interfaces, each of the first communication interface being in electrical connection with the first controller and the first audio signal processing circuit; wherein each of the slave sound receiving/broadcasting devices comprises: a sound input device, which is operable to receive a second input sound and generate a second audio input signal; a sound output device; a second audio signal processing circuit, the second audio signal processing circuit being in electrical connection with the sound input device and the sound output device; a second controller, which is in electrical connection with the second audio signal processing circuit; and a second communication interface, which is in electrical connection with the second controller; wherein each of the first communication interfaces of the master device is paired with and in wireless communication connection with the second communication interface of a different one of the slave sound receiving/broadcasting devices; wherein the master device, in response to receiving the first audio input signal, transmits separately a first transmission signal to each of the slave sound receiving/broadcasting devices according to the first audio input signal, and all of the slave sound receiving/broadcasting devices make the sound output device of each of the slave sound receiving/broadcasting devices outputting a corresponding first output sound according to the first transmission signal received thereby; and wherein when the sound input device of one of the slave sound receiving/broadcasting devices receives the second input sound and generates the second audio input signal, the one of the slave sound receiving/broadcasting devices that generates the second audio input signal transmits, according to the second audio input signal, a second transmission signal to the master device, and the master device transmits separately a third transmission signal to each of the slave sound receiving/broadcasting devices according to the second transmission signal received thereby, and all of the slave sound receiving/broadcasting devices make the sound output device of each of the slave sound receiving/broadcasting devices outputting a corresponding second output sound according to the third transmission signal received thereby.

In one embodiment, each of the slave sound receiving/broadcasting devices is arranged to be switchable between a sound-inputting mode and a non-sound-inputting mode, and the sound receiving/broadcasting system is arranged to allow only a limited number of the slave sound receiving/broadcasting devices to be simultaneously set in the sound-inputting mode, and each of the slave sound receiving/broadcasting devices that is not in the sound-inputting mode is set in the non-sound-inputting mode, wherein when the slave sound receiving/broadcasting devices are in the sound-inputting mode, the sound input devices of the slave sound receiving/broadcasting devices are operable to receive the second input sound and generate the second audio input signal, and the sound output devices of all of the slave sound receiving/broadcasting devices separately output the corresponding second output sounds according to the second audio input signal; and when the slave sound receiving/broadcasting devices are in the non-sound-inputting mode, the sound input devices of the slave sound receiving/broadcasting devices do not generate the second audio input signal.

In one embodiment, the sound receiving/broadcasting system is further configured such that when one of the slave sound receiving/broadcasting devices that are in the non-sound-inputting mode is switched from the non-sound-inputting mode to the sound-inputting mode, one of the slave sound receiving/broadcasting devices that is in the sound-inputting mode switched from the sound-inputting mode to the non-sound-inputting mode.

In one embodiment, when the sound input device receives the first output sound or the second output sound to cause the sound output device to generate audio feedback to induce howling, the second controller acquires, through the second audio signal processing circuit, a howling audio signal that is generated with the howling received by the sound input device and eliminates the howling audio signal.

In one embodiment, for each of the slave sound receiving/broadcasting devices receiving the first transmission signal, the second controller and the second audio signal processing circuit generate a first audio output signal according to the first transmission signals, and for each of the slave sound receiving/broadcasting devices receiving the third transmission signal, the second controller and the second audio signal processing circuit generate a second audio output signal according to the third transmission signal, and the sound output device outputs the first output sound according to the first audio output signal or outputs the second output sound according to the second audio output signal, and the second controller is configured to: acquire frequency data of the first audio output signal or the second audio output signal by means of the second audio signal processing circuit; acquire frequency data of the second audio input signal by means of the second audio signal processing circuit; and compare the frequency data of the first audio output signal or the second audio output signal with the frequency data of the second audio input signal, and eliminate the second audio input signal when the second controller determines the frequency data of the second audio input signal corresponds to the frequency data of the first audio output signal or the second audio output signal.

In one embodiment, the sound input device comprises a microphone, and the sound output device comprises a loudspeaker.

In one embodiment, the first communication interfaces of the master device are in communication connection with the second communication interfaces of each of the slave sound receiving/broadcasting devices by means of Bluetooth protocol.

In one embodiment, the external device is connectable through a network with a server computing device, and the server computing device is loaded with video conference software, and the master device generates the third audio output signal according to the third transmission signal and transmits the third audio output signal to the external device.

In one embodiment, the external device comprises a video conference host device, a notebook computer, a tablet computer, or a mobile phone.

The sound receiving/broadcasting system according to the present invention uses the master device and the plurality of slave sound receiving/broadcasting devices to process and transmit audio signals generated with sounds. The master device is set in a wireless communication connection with each of the slave sound receiving/broadcasting devices. The master device is connectable with to an external device (such as a microphone), and a sound inputted through the external device can be released through each of the slave sound receiving/broadcasting devices, and a sound received by each of the slave sound receiving/broadcasting devices can be transferred through the master device to be released through all of the slave sound receiving/broadcasting devices. The master device of the sound receiving/broadcasting system according to the present invention is also connectable with a video conference host device available in the market, or is connectable with a notebook computer, a tablet computer, or a mobile phone, and when a local person and a remote person conduct a trans-network video conference, a sound of the remote conference participant is released through each of the slave sound receiving/broadcasting devices, and a sound of the local conference participant is received through each of the slave sound receiving/broadcasting devices for transmission to the remote conference participant. The sound receiving/broadcasting system according to the present invention provides a function that allows each of the local and remote conference participants to hear sounds from other participants and to transmit sounds to other participants, so as to suit the needs for large-space multiple-participant conferences and remote video conferences. Further, the slave sound receiving/broadcasting devices are easily expandable with respect to the number thereof, allowing for flexible adjustment according to the number of participants and also bringing easiness of use.

BRIEF DESCRIPTION OF THE DRAWINGS

FIG. 4C1 is a schematic view showing the operation of the sound receiving/broadcasting system according to the present invention after the master device receives the first audio input signal generated by the first input sound.

FIG. 4C2 is a schematic view showing a sound output device of the sound receiving/broadcasting system according to the present invention outputting the first output sound generated according to the first input sound.

FIG. 4D1 is a schematic view showing the sound receiving/broadcasting system according to the present invention, upon receiving the second input sound at one slave sound receiving/broadcasting device generating the second output sound at all slave sound receiving/broadcasting devices according to the second input sound.

FIG. 4D2 is a schematic view showing the operation of the sound receiving/broadcasting system according to the present invention in response to receiving the second input sound at one slave sound receiving/broadcasting device.

FIG. 4D3 is a schematic view showing when the sound receiving/broadcasting system according to the present invention receives the second input sound at one slave sound receiving/broadcasting device, a user computing device correspondingly outputting the third output sound.

DETAILED DESCRIPTION OF THE PREFERRED EMBODIMENTS

A detailed description and technical contents related to the present invention will be explained below with reference to the attached drawings. However, the drawings are provided only for reference and illustration to assist in understanding the present invention and are not intended to constrain the scope of the present invention.

Figure 1:
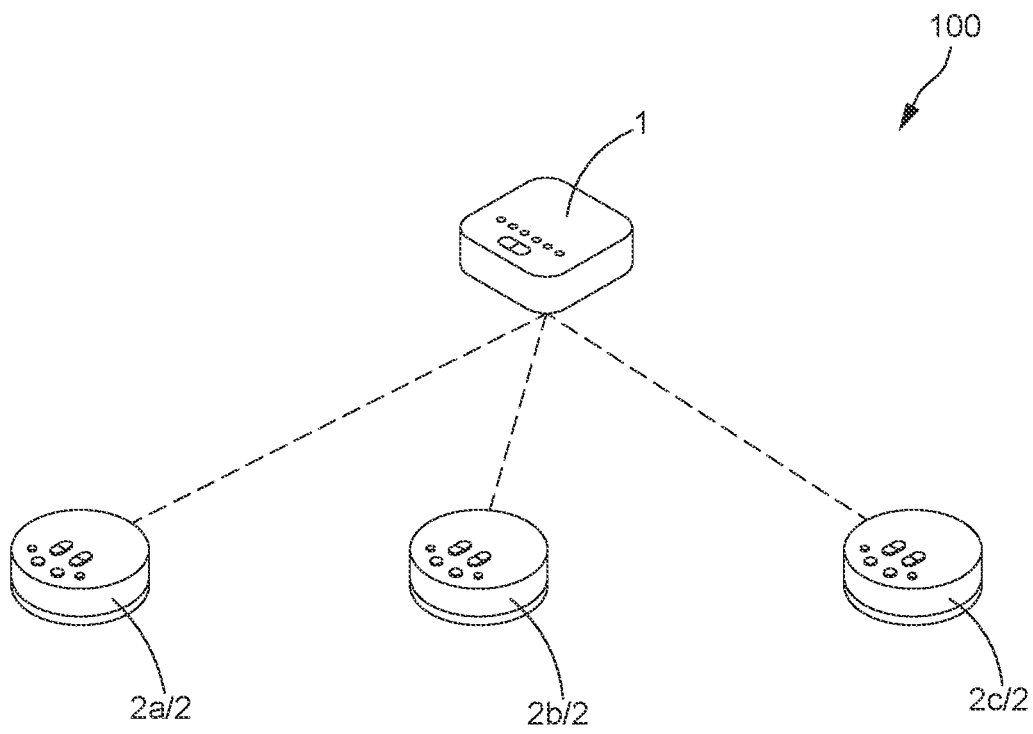
FIG. 1 is a schematic view showing a sound receiving/broadcasting system according to the present invention.

Firstly, reference is made to FIG. 1, which provides a schematic view showing an embodiment of a sound receiving/broadcasting system according to the present invention. The sound receiving/broadcasting system 100 comprises: a master device 1 and a plurality of slave sound receiving/broadcasting devices 2 (2a, 2b, 2c). The master device 1 is in wireless communication connection with each of the slave sound receiving/broadcasting devices 2.

Figure 2A:
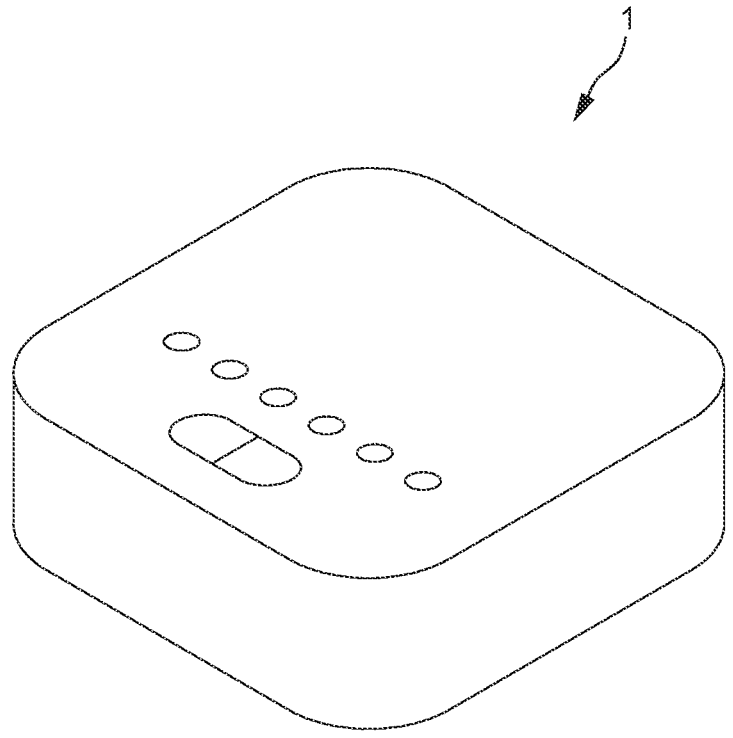
FIG. 2A is a schematic view showing an exterior appearance of an embodiment of a master device of the sound receiving/broadcasting system according to the present invention.
Figure 2B:
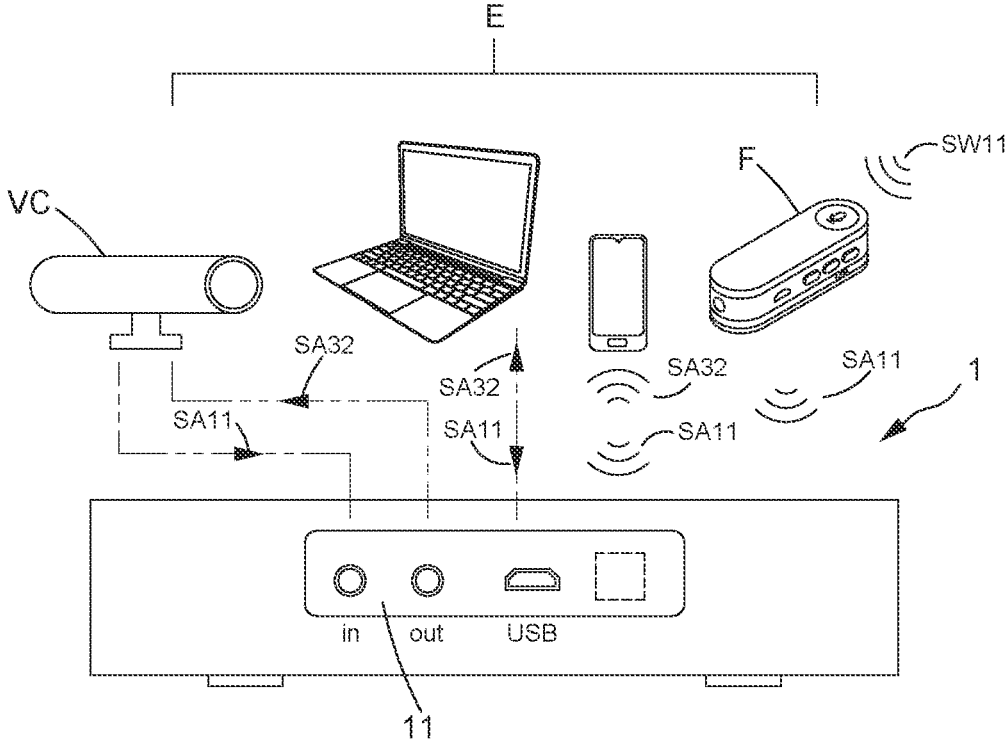
FIG. 2B is a schematic view showing an exterior appearance of an audio input/output interface of the master device shown in FIG. 2A.
Figure 2C:
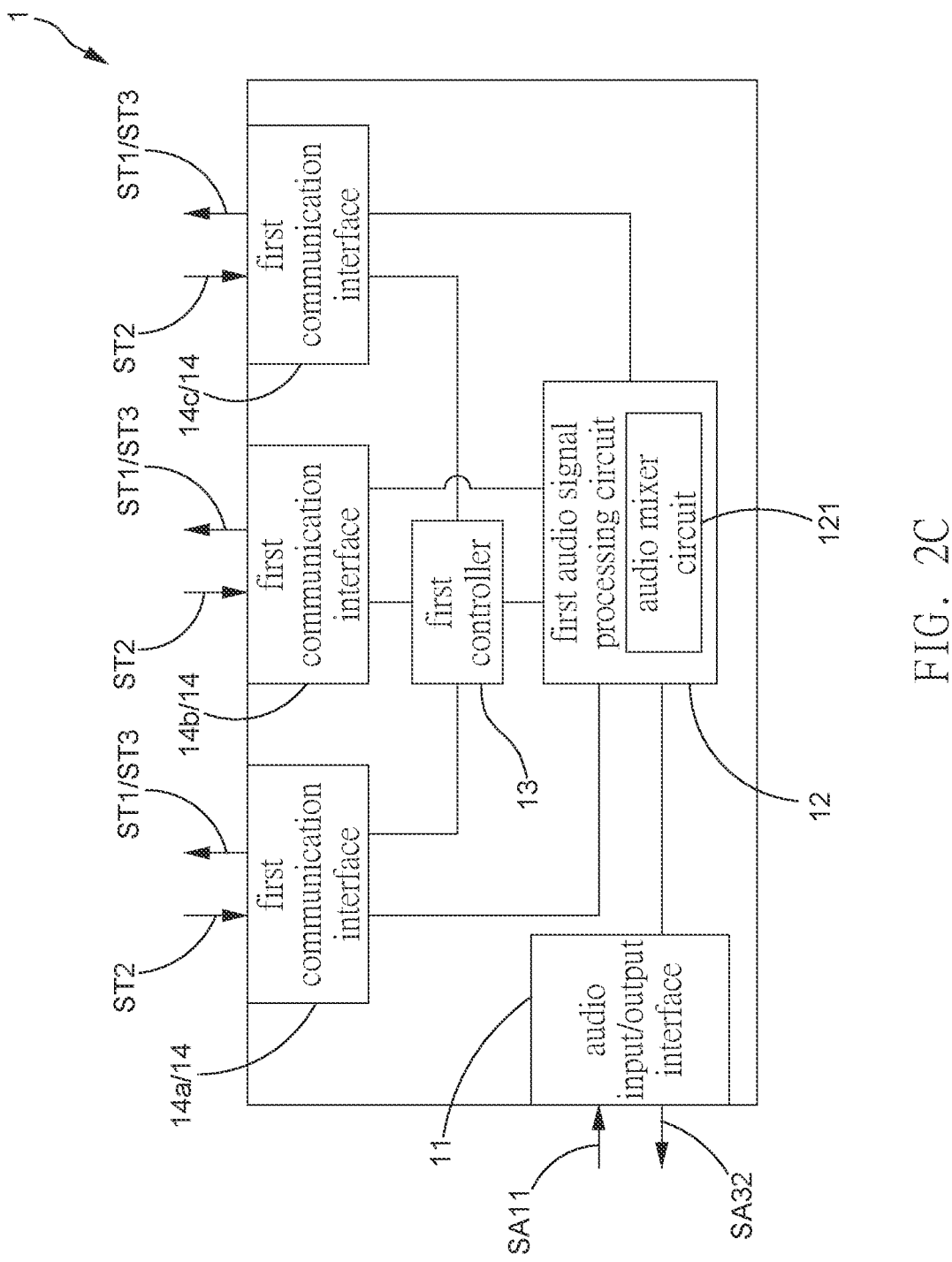
FIG. 2C is a block diagram showing an embodiment of the master device of the sound receiving/broadcasting system according to the present invention.

FIGS. 2A to 2C shows an exterior appearance and a functional block diagram of an embodiment of the master device 1. The master device 1 comprises an audio input/output interface 11, a first audio signal processing circuit 12, a first controller 13, and a plurality of first communication interfaces 14 (14a, 14b, 14c).

The audio input/output interface 11 is provided for connecting an external device E with the master device 1 in a wired or wireless manner. The audio input/output interface 11 is arranged to receive from an external device E a first audio input signal SA11 generated with the first input sound. Based on the type of the external device E, in some embodiments, the audio input/output interface 11 can also be arranged to transmit a third audio output signal SA32 to the external device E. The audio input/output interface 11 may use USB, Bluetooth, or other technical protocols (such as OMTP and CTIA), together with a corresponding connector, to transmit audio data. The first audio input signal SA11 and the third audio output signal SA32 can be analog signals or digital signals. The external device E can be a mobile phone, a tablet computer, a notebook computer, a microphone F, or a video conference host device VC. The first input sound refers to sound that is directly receivable by the external device E, such as a speech sound from a user of the external device E or sound from the environment in which the external device E is located, or refers to sound of the user received by a device directly or indirectly connected to the external device E or sound from the environment in which the device is located.

Figure 3A:
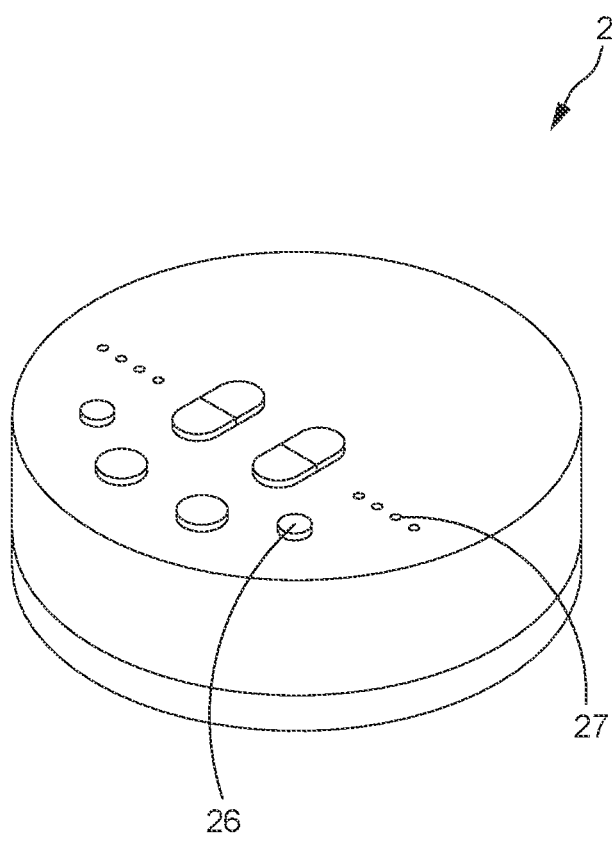
FIG. 3A is a schematic view showing an exterior appearance of a slave sound receiving/broadcasting device of the sound receiving/broadcasting system according to the present invention.
Figure 3B:
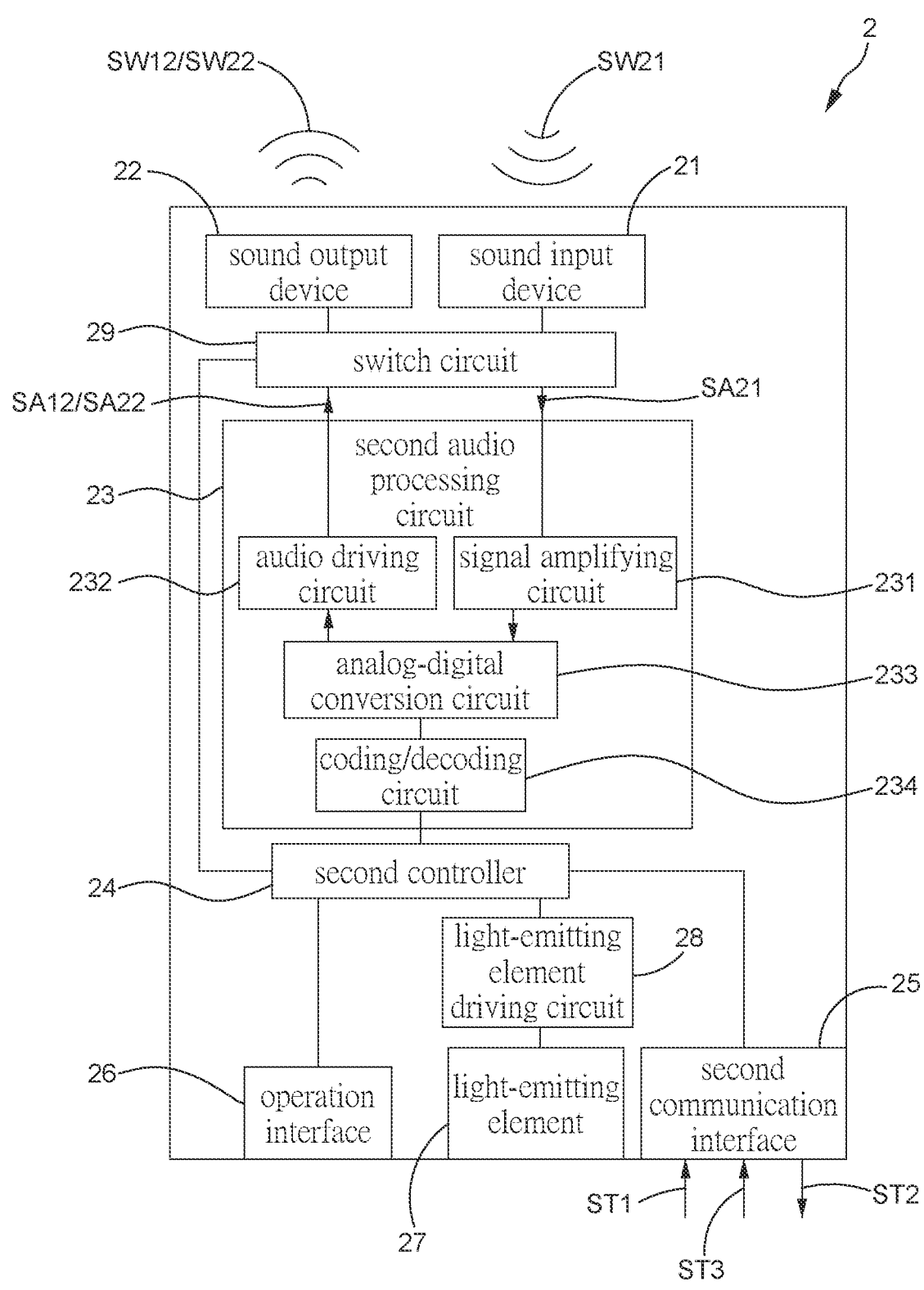
FIG. 3B is a block diagram showing the slave sound receiving/broadcasting device of the sound receiving/broadcasting system according to the present invention.
Figure 4A:
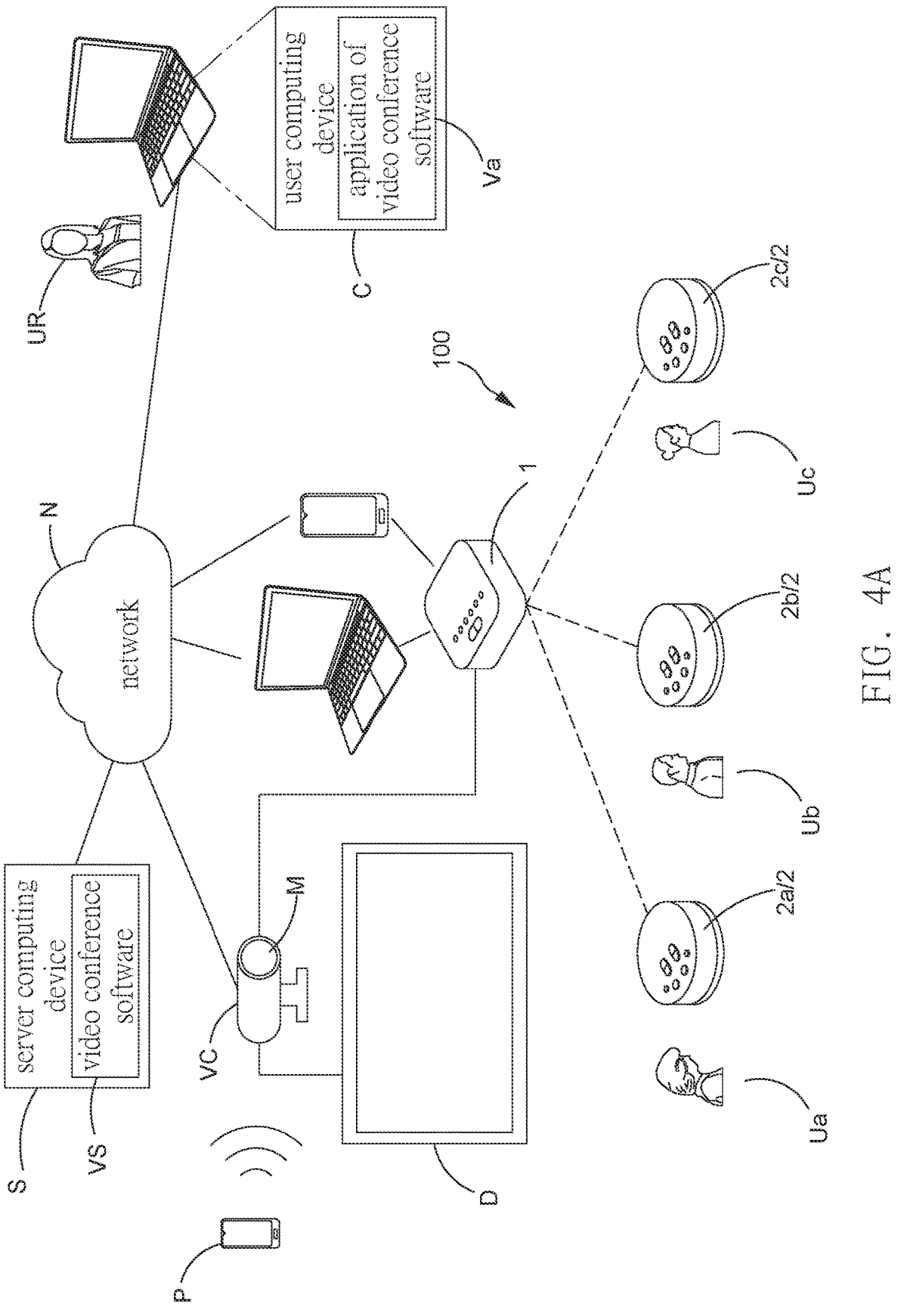
FIG. 4A is a schematic view showing an application of the sound receiving/broadcasting system according to the present invention in connection with a video conference host device or a notebook computer, and a mobile phone to the implementation of an online conference.

As shown in FIGS. 4A to 4D3, when the sound receiving/broadcasting system 100 is used in a trans-network video conference, the external device connected to the master device 1 can be a video conference host device VC, a notebook computer, a tablet computer, or a mobile phone. The first input sound SW11 refers to sound that is received by a user computing device C used by a remote conference participant UR (such as speech sound from the conference participant UR or sound from the environment in which the user computing device C is located).

The first audio signal processing circuit 12 is in electrically connection with the audio input/output interface 11. The first audio signal processing circuit 12 comprises an audio mixer circuit 121. The audio mixer circuit 121 is operable to mix and output a plurality of audio signals. The first audio signal processing circuit 12 may also comprise circuitry for audio signal processing, such as noise reduction, amplification, optimization, and digital-analog conversion.

The first controller 13 may comprise a processor, a memory, a timing/counting circuit, and input and output interfaces. The processor can be a processor in the form of a central processing unit (CPU) andmay alternatively comprise a special purpose processor, such as a digital signal processor (DSP). The memory can be a read-only memory (ROM), a random access memory (RAM), or a flash memory. The first controller 13 can be a microcontroller (MCU), a single-board computer, a microcomputer, or other devices having similar function.

The first controller 13 may include a universal asynchronous receiver/transmitter (UART) integrated therewith to implement data format conversion between a parallel form and a serial form to enable data transmission between a peripheral device and the processor of the first controller 13.

The master device 1 may receive data from other devices and transmit data to other devices by means of the first communication interfaces 14. The first communication interfaces 14 may comprise a transceiver, a filter, and an antenna. The first communication interfaces 14 is arranged to transmit a radio signal as a communication medium and to receive a radio signal. The first communication interfaces 14 can be a Bluetooth module or a Wi-Fi module.

The plurality of slave sound receiving/broadcasting devices 2 comprises a sound input device 21, a sound output device 22, a second audio signal processing circuit 23, a second controller 24, and a second communication interface 25.

The sound input device 21 is operable to receive the second input sound SW21 and generate a second audio input signal SA21. The sound input device 21 includes an internal component that converts vibration generated by sound into an electrical signal (a second audio input signal SA21 shown in FIG. 3B). The sound input device 21 can be a microphone, and the microphone is operable to pick up the sound by means of a beamforming technique. As shown in FIGS. 4A to 4D3, when the sound receiving/broadcasting system 100 is used in a trans-network video conference, the second input sound SW21 refers to speech sound from conference participants Ua, Ub, Uc, or sound from the environment in which the sound input device 21 and the slave sound receiving/broadcasting devices 2 are located.

The sound output device 22 is operable to output sound. The sound output device 22 includes an internal component that is operable to convert an electrical signal into mechanical vibration to generate sound. The sound output device 22 can be a loudspeaker.

The second audio signal processing circuit 23 is in electrical connection with the sound input device 21 and the sound output device 22. The second audio signal processing circuit 23 may comprise a signal amplifying circuit 231, an audio driving circuit 232, an analog-digital conversion circuit 233, and a coding/decoding circuit 234. The signal amplifying circuit 231 is in electrically connection with the sound input device 21 to amplify the electrical signal generated by the sound input device 21. The audio driving circuit 232 is operable to output an electrical signal that drives the sound output device 22 to produce sound. The analog-digital conversion circuit 233 converts a signal from an analog form into a digital form, or converts a signal from a digital form into an analog form. The coding/decoding circuit 234 comprises an audio codec, which is operable according to an algorithm to compress audio data for storage or transmission, or to decompress data for broadcasting.

The second controller 24 may comprise a processor, a memory, a timing/counting circuit, and input and output interfaces. The processor can be a processor in the form of a central processing unit (CPU) and may alternatively comprise a special purpose processor, such as a digital signal processor (DSP). The memory can be a read-only memory (ROM), a random access memory (RAM), or a flash memory. The second controller 24 can be a microcontroller (MCU), a single-board computer, a microcomputer, or other devices having similar functionality.

The second communication interface 25 may comprise a transceiver, a filter, and an antenna. The second communication interface 25 is arranged to transmit a radio signal as a communication medium and to receive a radio signal. The second communication interface 25 can be a Bluetooth module or a Wi-Fi module.

Each of the first communication interfaces 14 (14*a*, 14*b*, 14*c*) of the master device 1 is paired with and in wireless communication connection with the second communication interface 25 of one of the slave sound receiving/broadcasting devices 2 (2*a*, 2*b*, 2*c*). In the instant embodiment, the first communication interfaces 14 of the master device 1 are respectively in communication connection with the second communication interfaces 25 of the slave sound receiving/broadcasting devices 2 by means of Bluetooth protocol. Optionally, the first communication interfaces 14 of the master device 1 may be respectively set in communication connection with the second communication interfaces 25 of the slave sound receiving/broadcasting devices 2 by means of Wi-Fi protocol.

The sound receiving/broadcasting system 100 according to the present invention can be used in remote multi-participant conference applications. FIG. 4A shows a plurality of local conference participants Ua, Ub, Uc use the sound receiving/broadcasting system 100 to connect with external devices, such as a video conference host device VC, a notebook computer, a tablet computer, or a mobile phone to hold a trans-network video conference with a remote conference participant UR.

As shown in FIG. 4A, in the instant embodiment, the master device 1 of the sound receiving/broadcasting system 100 is connectable through the audio input/output interface 11 to a video conference host device VC. The video conference host device VC may be provided with a camera M and is connected with a display device D, or may be simultaneously connectable with multiple display devices (not shown) by means of a display hub. The local conference participants Ua, Ub, Uc use the video conference host device VC to connect through a network N to a server computing device S (such as a server computer) and execute video conference software V (such as cloud video platform Zoom, Microsoft Teams, Google Meet available in the market). The remote conference participant UR uses a user computing device C (such as a desktop computer, a notebook computer, a tablet computer, or a mobile phone) to access the server computing device S through network N and execute the video conference software V. In some embodiments, the video conference software V can be downloaded, in the form of an application program, to the user computing device C (such as an application Va of video conference software shown in FIG. 4A) and executed by the user computing device C. The camera M of the video conference host device VC and the user computing device C may respectively pick up images of the local conference participants Ua, Ub, Uc and an image of the remote conference participant UR for uploading to the server computing device S. The server computing device S is operable to execute the video conference software V to have conference video/audio streaming transmitting through the network N to the video conference host device V. A video signal from the video/audio streaming is transmitted to the display device D and is also transmitted to the user computing device C. An audio signal from the video/audio streaming (such as the first audio input signal SA11) is transmitted to the audio input/output interface 11 of the master device 1 and is also transmitted to the user computing device C. Optionally, as shown in FIG. 4A, in addition to connection with the video conference host device VC, the master device 1 of the sound receiving/broadcasting system 100 is also connectable with an external device, such as a notebook computer, a tablet computer, or a mobile phone, to implement the video conference. Such a device, such as the notebook computer, the tablet computer, or the mobile phone, is connectable, through the network N, to the server computing device S and is operable to execute the video conference software V and to receive the video/audio streaming of the video conference to have an audio signal from the video/audio streaming (such as the first audio input signal SA11) transmitted to the audio input/output interface 11 of the master device 1. The network N can be implemented with wired or wireless communication techniques available in the market, such as Wi-Fi, 3G, 4G, 4G LTE, 5G, LAN, MAN, WAN, and Internet. In some embodiments, the local conference participants Ua, Ub, Uc may use a remote control P (such as a tablet or a smart mobile phone) and a built-in application program to operate the video conference host device VC (such as adjusting a lens of the camera M or adjusting a displaying screen of the video conference).

Figure 4B:
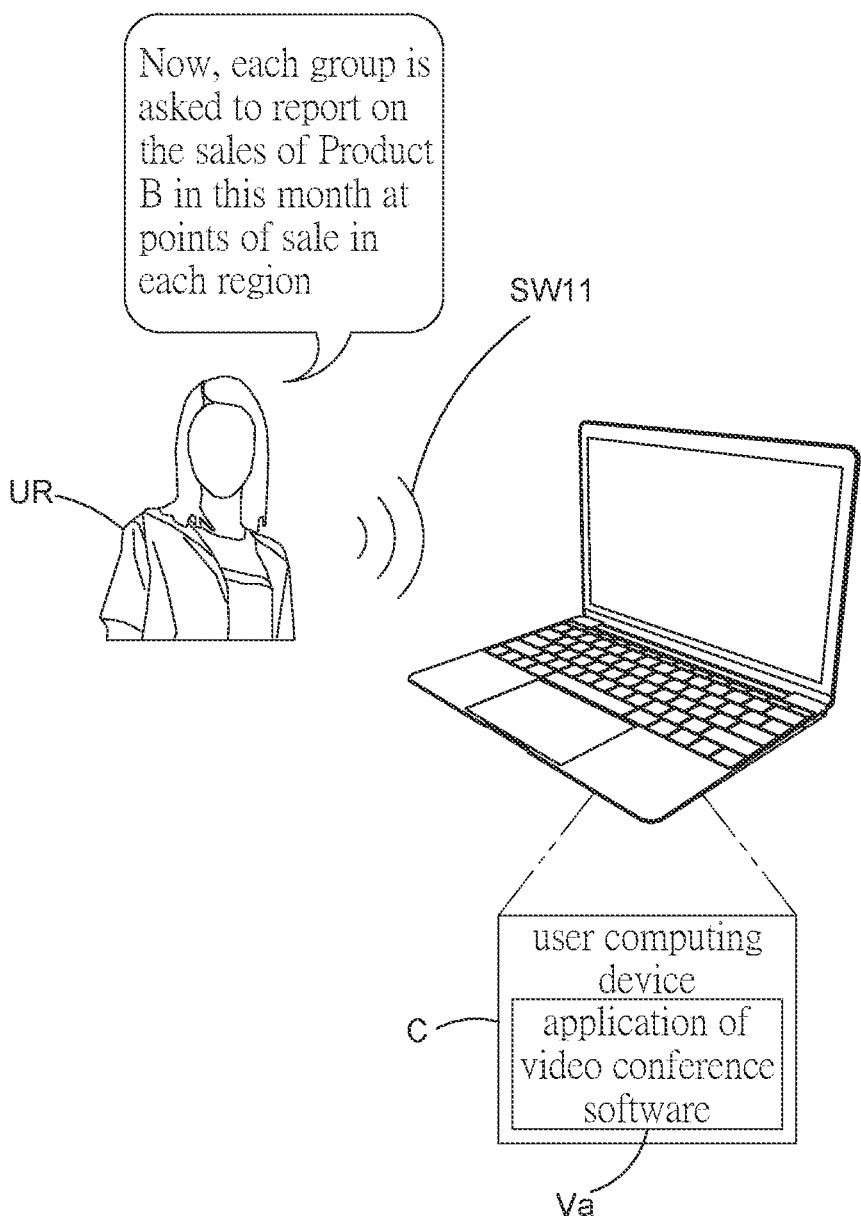
FIG. 4B is a schematic view showing a remote conference participant vocalizing the first input sound.

In FIGS. 4B to 4D3 and the related paragraphs of the disclosure, the master device 1 of the sound receiving/broadcasting system 100 being made connected with a video conference host device VC is provided as an example for illustrating the operation of the sound receiving/broadcasting system 100 in holding a trans-network video conference. For connecting ability of the master device 1 with other external devices E which is shown in FIGS. 2B and 4A (notebook computer, tablet computer, and mobile phone) to implement a trans-network video conference, the principle of operation of the sound receiving/broadcasting system 100 is similar to that of connection with the video conference host device VC, and thus, repeated illustration and explanation will not be provided herein.

As shown in FIGS. 2C, 4A, 4B, and 4C1, the first input sound SW11 generated by a speech of the remote conference participant UR is received by the user computing device C and is processed by the user computing device C to convert into an electrical signal. The electrical signal is processed and transmitted by the server computing device S and the video conference host device VC to generate the first audio input signal SA11. The audio input/output interface 11 of the master device 1 receives the first audio input signal SA11 generated with the first input sound SW11 from the video conference host device VC. The first audio signal processing circuit 12 and the first controller 13 are operable to process the first audio input signal SA11. The first audio input signal SA11 so processed is transmitted to each of the first communication interfaces 14 (14*a*, 14*b*, 14*c*) to generate a plurality of first transmission signals ST1.

As shown in FIGS. 3B, 4C1, and 4C2, each of the first transmission signals ST1 is received by the second communication interface 25 of each corresponding one of the slave sound receiving/broadcasting devices 2 (2*a*, 2*b*, 2*c*). The first transmission signals ST1, after being received by the second communication interfaces 25, are processed by the second controllers 24 and the second audio signal processing circuits 23 to generate the first audio output signals SA12 according to the first transmission signals ST1, so that the sound output device 22 of each of the slave sound receiving/broadcasting devices 2 (2a, 2b, 2c) may separately output a corresponding first output sound SW12 according to the first audio output signal SA12. Each of the conference participants Ua, Ub, Uc respectively operate and use the slave sound receiving/broadcasting devices 2a, 2b, 2c to hear the first output sound SW12 to get aware of the speech contents of the conference participant UR. This function is just like that the remote conference participant UR uses the master device 1 and each of the slave sound receiving/broadcasting devices 2 to make broadcasting to each of the conference participants Ua, Ub, Uc. Optionally, when the audio input/output interface 11 of the master device 1 is connected with the microphone F, the microphone F may function to receives the first input sound SW11 issued by the user (not shown) for conversion into the first audio input signal SA11 to have, through mechanisms of audio processing, transmitting, outputting, and receiving similar to what described previously, the sound output device 22 of each of the slave sound receiving/broadcasting devices 2 separately outputting a corresponding first output sound SW12 (see FIGS. 2B, 2C, and 3B). Therefore, the sound receiving/broadcasting system 100 also allows an on-site conference host to use the microphone F to make broadcasting through the master device 1 and each of the slave sound receiving/broadcasting devices 2 to have the conference participants adjacent to each of the slave sound receiving/broadcasting devices 2 to hear the contents of the speech.

As shown in FIGS. 2C, 3B, 4D1, and 4D2, when the sound input device 21 of one of the slave sound receiving/broadcasting devices 2 receives second input sound SW21 generated with a speech made by one conference participant Ua, Ub, Uc, the sound input device 21 of the slave sound receiving/broadcasting device 2 generates a second audio input signal SA21. The second audio input signal SA21 is processed by the second audio signal processing circuit 23 and the second controller 24, and the second communication interface 25 generates a second transmission signal ST2. The second transmission signal ST2 is received by the first wireless communication interface 14 of the master device 1 and is processed by the first controller 13 and the first audio signal processing circuit 12, and thus, the first communication interfaces 14 (14a, 14b, 14c) generate a plurality of third transmission signals ST3. Each of the third transmission signals ST3 is received by the second communication interface 25 of a corresponding one of the slave sound receiving/broadcasting devices 2. After the second communication interface 25 of each of the slave sound receiving/broadcasting devices 2 receives the third transmission signal ST3, the second controller 24 and the second audio signal processing circuit 23 carry out processing to generate a second audio output signal SA22 according to the third transmission signal ST3, so that the sound output device 22 of each of the slave sound receiving/broadcasting devices 2 (2a, 2b, 2c) separately output corresponding second output sound SW22 according to the second audio output signal SA22. Each of the conference participants Ua, Ub, Uc may respectively use the slave sound receiving/broadcasting devices 2a, 2b, 2c to hear the second output sound SW22 so as to get aware of the speech contents of the conference participant Ua. (In FIGS. 4D1 and 4D2, the conference participant Ua and the slave sound receiving/broadcasting device 2a are taken as an example for illustration, and other cases may be inferred therefrom).

Further, as shown in FIGS. 2C, 3B, 4A, 4D1, 4D2, and 4D3, when the sound input device 21 of one of the slave sound receiving/broadcasting devices 2 (2a, 2b, 2c) receives second input sound SW21, and generates the second audio input signal SA21 and transmits the second transmission signal ST2, the master device 1, upon receiving the second transmission signal ST2, in addition to generating a third transmission signal ST3 with the first communication interface 14, is operable to generates a third audio output signal SA32 according to the second transmission signal ST2 and to transmit the third audio output signal SA32 to the video conference host device VC. The third audio output signal SA32, after being transmitted to the video conference host device VC, is transmitted through the network N and the server computing device S to the user computing device C to have the user computing device C generate third output sound SW32, so that the remote conference participant UR may hear the speech contents of the conference participant Ua.

As shown in FIGS. 3A and 3B, the slave sound receiving/broadcasting devices 2 are provided with an operation interface 26 and a switch circuit 29. The operation interface 26 is connected to the second controller 24. The switch circuit 29 is in electrical connection with the sound input device 21, the sound output device 22, and the second controller 24, or may alternatively be integrated with the sound input device 21 or the sound output device 22. The switch circuit 29 functions to control the activation/deactivation of the sound input device 21 and the sound output device 22. The user of the slave sound receiving/broadcasting device 2 can use the operation interface 26 to operate the function of the slave sound receiving/broadcasting device 2, such as controlling the output volume of the sound output device 22 and controlling activation/deactivation of the sound input device 21 and the sound output device 22. Further, the slave sound receiving/broadcasting device 2 may be provided with a light-emitting element 27 and a light-emitting element driving circuit 28. The light-emitting element driving circuit 28 is in electrically connection with the second controller 24. When the user presses down various buttons of the operation interface 26, the second controller 24 may control a corresponding part of the light-emitting element 27 to light up in order to remind the user of a mode in which the slave sound receiving/broadcasting device 2 is currently set. In some embodiments, the remote control P that shown in FIG. 4A may have an application program installed therein and operable to display the electrical power capacity of the master device 1, adjust the output volume of the sound output device 22 of each of the slave sound receiving/broadcasting devices 2, and do on/off control of the sound input device 21 and the sound output device 22 of each slave sound receiving/broadcasting devices 2.

Optionally, in some embodiments, when there are a large number of conference participants, the amounts of the slave sound receiving/broadcasting devices 2 used exceeds a predetermined threshold, considering the difficulty and complexity of audio signal processing, the sound receiving/broadcasting system 100 is set to allow only a predetermined or fixed number of the slave sound receiving/broadcasting devices 2 to simultaneously receive the second input sound SW21 by means of their the sound input devices 21.

Figure 5A:
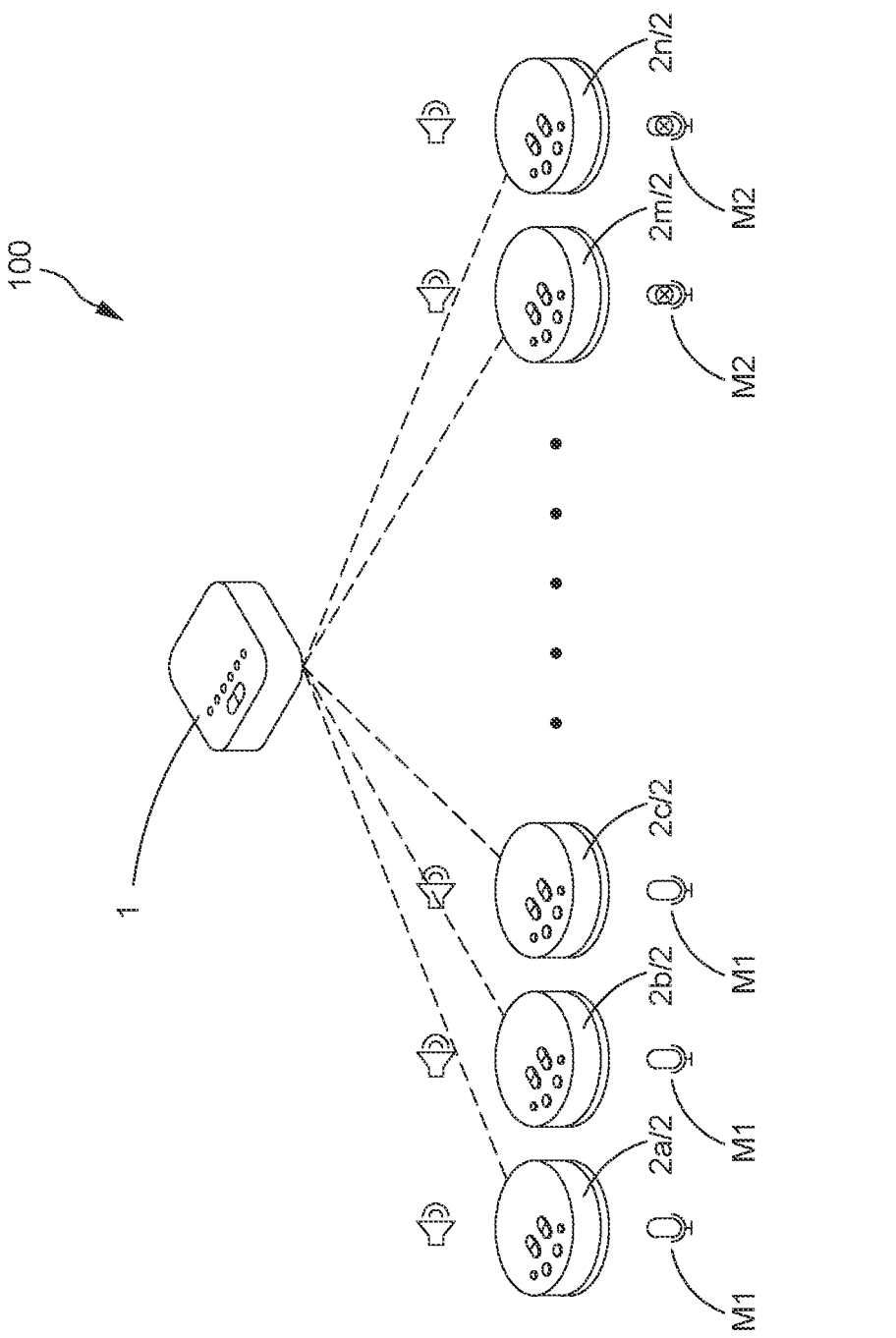
FIG. 5A is a schematic view showing the sound receiving/broadcasting system according to the present invention allowing only a limited number of the slave sound receiving/broadcasting devices to be simultaneously set to a sound-inputting mode.
Figure 5B:
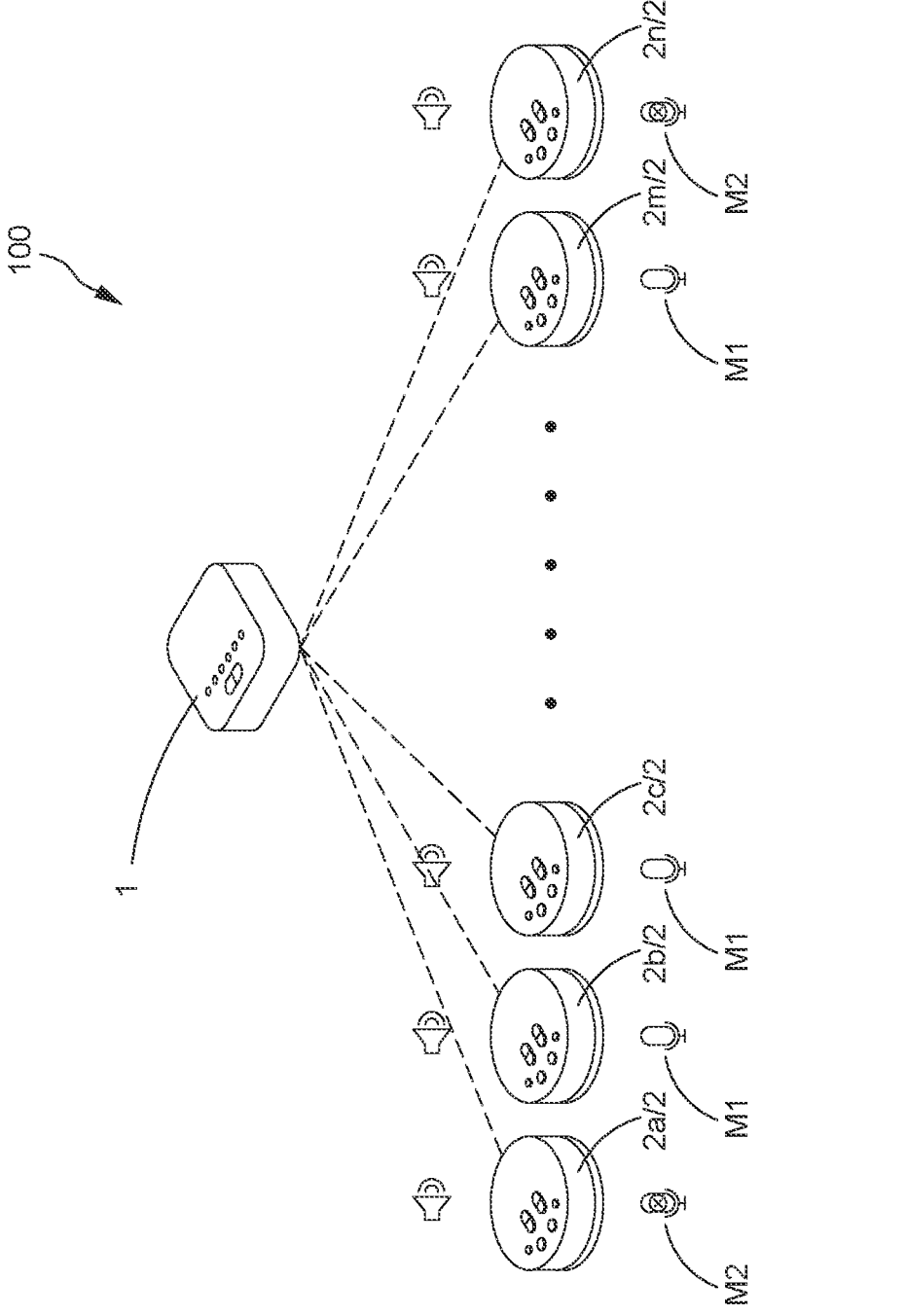
FIG. 5B is a schematic view showing, in the sound receiving/broadcasting system according to the present invention, when one of the slave sound receiving/broadcasting devices that are set in a non-sound-inputting mode is switched from the non-sound-inputting mode to the sound-inputting mode, one of the slave sound receiving/broadcasting devices that are set in the sound-inputting mode is switched from the sound-inputting mode to the non-sound-inputting mode.

As shown in FIGS. 5A and 5B, the slave sound receiving/broadcasting devices 2 are each arranged to be switchable between a sound-inputting mode M1 and a non-sound-inputting mode M2, and the sound receiving/broadcasting system 100 is arranged to allow only a limited number of the slave sound receiving/broadcasting devices 2 (2a, 2b, 2c) to be simultaneously set in the sound-inputting mode M1 at a given time, while the slave sound receiving/broadcasting devices 2 (2m, 2n) that are not in the sound-inputting mode are set in the non-sound-inputting mode M2. For the slave sound receiving/broadcasting devices 2 that are set in the sound-inputting mode M1, in a way similar to what discussed and shown in the previous embodiments and drawings, the sound input devices 21 of the slave sound receiving/broadcasting devices 2 may receive the second input sound SW21 and generate the second audio input signal SA21, and the sound receiving/broadcasting system 100 makes the sound output devices 22 of all of the slave sound receiving/broadcasting devices 2 to separately output a corresponding second output sound SW22 according to the second audio input signal SA21. For the slave sound receiving/broadcasting devices 2 that are set in the non-sound-inputting mode M2, the sound input devices 21 of the slave sound receiving/broadcasting devices 2 do not generate the second audio input signal SA21 (for example, by turning off the sound input device 21 by means of the switch circuit 29).

As shown in FIGS. 5A and 5B, when other conference participants, who wish to make a speech, use the operation interface 26 to switch one of the slave sound receiving/broadcasting devices 2 (such as the slave sound receiving/broadcasting devices 2m) that are in the non-sound-inputting mode M2 from the non-sound-inputting mode M2 to the sound-inputting mode M1, the sound receiving/broadcasting system 100 switches one of the slave sound receiving/broadcasting devices 2 (the slave sound receiving/broadcasting devices 2a) that are in the sound-inputting mode M1 from the sound-inputting mode into the non-sound-inputting mode M2. The sound receiving/broadcasting system 100 may have a first-in-first-out setting built therein for the operation. For example, in the beginning, only the sound input devices 21 of the slave sound receiving/broadcasting devices 2a, 2b, 2c are set in the sound-inputting mode M1, and when the slave sound receiving/broadcasting device 2m is initially set in the non-sound-inputting mode M2 is switched from the non-sound-inputting mode M2 into the sound-inputting mode M1, the slave sound receiving/broadcasting device 2a that is the one that first joins the conference is switched into the non-sound-inputting mode M2.

In some embodiments, when the sound input device 21, upon receiving output sound (the first output sound SW12 or the second output sound SW22) of the sound output device 22, generates feedback of echo so as to induce howling (not shown), the second controller 24 acquires, through the second audio signal processing circuit 23, a howling audio signal (not shown) generated with the howling received by the sound input device 21 and eliminates the howling audio signal to prevent the howling from being repeatedly fed back and amplified by the sound receiving/broadcasting system 100.

In some embodiments, before the sound output device 22 outputs the first output sound SW12 or the second output sound SW22 according to the second audio output signal SA22, the second controller 24 acquires, through the second audio signal processing circuit 23, frequency data of the first audio output signal SA21 or the second audio output signal SA22. After the sound input device 21 converts the received sound into the second audio input signal SA21, the second controller 24 acquires, through the second audio signal processing circuit 23, the frequency data of the second audio input signal SA21. The second controller 24 is operable to compare the frequency data of the first audio output signal SA12 or the second audio output signal SA22 with the frequency data of the second audio input signal SA21, so that in case the second controller 24 determines the frequency data of the second audio input signal SA21 is identical to the frequency data of the first audio output signal SA12 or the second audio output signal SA22, the sound that is received is treated as echo and the second audio input signal SA21 is eliminated, in order to prevent undesired sound from being received by the sound input device 21 and inputted into the sound receiving/broadcasting system 100.

The above provides only preferred feasible embodiments of the present invention and does not attend to limit the scope of the claims of the present invention. Equivalent structural variations that are made based on the disclosure and drawings of the present invention are considered equally falling in the scope of the present invention defined by the claims.

What is claimed is:

1. A sound receiving/broadcasting system, comprising a master device and a plurality of slave sound receiving/broadcasting devices, wherein the master device comprises:

an audio input/output interface, which is arranged to generate a first audio input signal from a first input sound received from an external device or to transmit a third audio output signal to the external device;

a first audio signal processing circuit, which is in electrical connection with the audio input/output interface, wherein the first audio signal processing circuit comprises an audio mixer circuit;

a first controller, which is in electrical connection with the first audio signal processing circuit; and a plurality of first communication interfaces, each of the first communication interface being in electrical connection with the first controller and the first audio signal processing circuit;

wherein each of the slave sound receiving/broadcasting devices comprises:

a sound input device, which is operable to receive a second input sound and generate a second audio input signal;

a sound output device;

a second audio signal processing circuit, the second audio signal processing circuit being in electrical connection with the sound input device and the sound output device;

a second controller, which is in electrical connection with the second audio signal processing circuit; and a second communication interface, which is in electrical connection with the second controller;

wherein each of the first communication interfaces of the master device is paired with and in wireless communication connection with the second communication interface of a different one of the slave sound receiving/broadcasting devices;

wherein the master device, in response to receiving the first audio input signal, transmits separately a first transmission signal to each of the slave sound receiving/broadcasting devices according to the first audio input signal, and all of the slave sound receiving/broadcasting devices make the sound output device of each of the slave sound receiving/broadcasting devices outputting a corresponding first output sound according to the first transmission signal received thereby;

wherein when the sound input device of one of the slave sound receiving/broadcasting devices receives the second input sound and generates the second audio input signal, the one of the slave sound receiving/broadcasting devices that generates the second audio input signal transmits, according to the second audio input signal, a second transmission signal to the master device, and the master device transmits separately a third transmission signal to each of the slave sound receiving/broadcasting devices according to the second transmission signal received thereby, and all of the slave sound receiving/broadcasting devices make the sound output device of each of the slave sound receiving/broadcasting devices outputting a corresponding second output sound according to the third transmission signal received thereby; and wherein each of the slave sound receiving/broadcasting devices is arranged to be switchable between a sound-inputting mode and a non-sound-inputting mode, and the sound receiving/broadcasting system is arranged to allow only a limited number of the slave sound receiving/broadcasting devices to be simultaneously set in the sound-inputting mode, and each of the slave sound receiving/broadcasting devices that is not in the sound-inputting mode is set in the non-sound-inputting mode, wherein when the slave sound receiving/broadcasting devices are in the sound-inputting mode, the sound input devices of the slave sound receiving/broadcasting devices are operable to receive the second input sound and generate the second audio input signal, and the sound output devices of all of the slave sound receiving/broadcasting devices separately output the corresponding second output sounds according to the second audio input signal; and when the slave sound receiving/broadcasting devices are in the non-sound-inputting mode, the sound input devices of the slave sound receiving/broadcasting devices do not generate the second audio input signal.

2. The sound receiving/broadcasting system according to claim 1, wherein the sound receiving/broadcasting system is further configured such that when one of the slave sound receiving/broadcasting devices that are in the non-sound-inputting mode is switched from the non-sound-inputting mode to the sound-inputting mode, one of the slave sound receiving/broadcasting devices that is in the sound-inputting mode switched from the sound-inputting mode to the non-sound-inputting mode.

3. The sound receiving/broadcasting system according to claim 1, wherein when the sound input device receives the first output sound or the second output sound to cause the sound output device to generate audio feedback to induce howling, the second controller acquires, through the second audio signal processing circuit, a howling audio signal that is generated with the howling received by the sound input device and eliminates the howling audio signal.

4. The sound receiving/broadcasting system according to claim 1, wherein for each of the slave sound receiving/broadcasting devices receiving the first transmission signal, the second controller and the second audio signal processing circuit generate a first audio output signal according to the first transmission signals, and for each of the slave sound receiving/broadcasting devices receiving the third transmission signal, the second controller and the second audio signal processing circuit generate a second audio output signal according to the third transmission signal, and the sound output device outputs the first output sound according to the first audio output signal or outputs the second output sound according to the second audio output signal, and the second controller is configured to: acquire frequency data of the first audio output signal or the second audio output signal by means of the second audio signal processing circuit; acquire frequency data of the second audio input signal by means of the second audio signal processing circuit; and compare the frequency data of the first audio output signal or the second audio output signal with the frequency data of the second audio input signal, and eliminate the second audio input signal when the second controller determines the frequency data of the second audio input signal corresponds to the frequency data of the first audio output signal or the second audio output signal.

5. The sound receiving/broadcasting system according to claim 1, wherein the sound input device comprises a microphone, and the sound output device comprises a loudspeaker.

6. The sound receiving/broadcasting system according to claim 1, wherein the first communication interfaces of the master device are in communication connection with the second communication interfaces of each of the slave sound receiving/broadcasting devices by means of Bluetooth protocol.

7. The sound receiving/broadcasting system according to claim 1, wherein the external device is connectable through a network with a server computing device, and the server computing device is loaded with video conference software, and the master device generates the third audio output signal according to the third transmission signal and transmits the third audio output signal to the external device.

8. The sound receiving/broadcasting system according to claim 7, wherein the external device comprises a video conference host device, a notebook computer, a tablet computer, or a mobile phone.

* * * * *